United States Patent [19]
Oskouy

[11] Patent Number: 5,982,772
[45] Date of Patent: Nov. 9, 1999

[54] CELL INTERFACE BLOCK PARTITIONING FOR SEGMENTATION AND RE-ASSEMBLY ENGINE

[75] Inventor: Rasoul M. Oskouy, Fremont, Calif.

[73] Assignee: Sun Microsystems, Inc., Mountain View, Calif.

[21] Appl. No.: 08/554,186

[22] Filed: Nov. 6, 1995

[51] Int. Cl.⁶ ............................... H04L 12/56; H04J 3/24
[52] U.S. Cl. ........................... 370/395; 370/474; 370/473
[58] Field of Search ..................................... 370/395, 412, 370/545, 249, 391, 401, 410, 465, 467, 470, 474, 389, 505, 516, 473; 371/205; 375/221, 225

[56] References Cited

U.S. PATENT DOCUMENTS

| | | | |
|---|---|---|---|
| 5,083,269 | 1/1992 | Syobatake et al. ...................... | 395/427 |
| 5,136,584 | 8/1992 | Hedlund .................................. | 370/474 |
| 5,157,655 | 10/1992 | Hamlin, Jr. et al. ..................... | 370/545 |
| 5,261,076 | 11/1993 | Shamshirian ............................ | 395/500 |
| 5,303,302 | 4/1994 | Burrows .................................. | 380/49 |
| 5,321,806 | 6/1994 | Meinerth et al. . | |
| 5,420,858 | 5/1995 | Marshall et al. ........................ | 370/395 |
| 5,434,872 | 7/1995 | Petersen et al. . | |
| 5,541,926 | 7/1996 | Saito et al. .............................. | 370/474 |
| 5,602,853 | 2/1997 | Ben-Michael et al. ................. | 370/395 |
| 5,638,367 | 6/1997 | Gaytan et al. .......................... | 370/471 |

FOREIGN PATENT DOCUMENTS

WO 92/22034  12/1992  WIPO .

OTHER PUBLICATIONS

Wescon Technical Papers, vol. 36, Nov. 17, 1992, pp. 174–178.

*Primary Examiner*—Chau Nguyen
*Assistant Examiner*—Soon-Dong Hyun
*Attorney, Agent, or Firm*—Blakely Sokoloff Taylor & Zafman

[57] ABSTRACT

A method and apparatus for interfacing between a Segmentation and Reassembly (SAR) circuit and an ATM Cell Interface is disclosed. The interface circuit comprises a transmit FIFO and a receive FIFO. The transmit FIFO transfers data from the System and ATM Layer Core in the SAR circuit to a Cell Interface block, which in turn dispatches the data to the ATM Cell Interface. The receive FIFO transfers data received from the ATM Cell Interface via the Cell Interface block, to the Core. Various interface signals provided between the Core and the transmit FIFO, the transmit FIFO and the Cell Interface block, the Core and the receive FIFO, and the receive FIFO and the Cell Interface block, are used to coordinate data transfer. The interface circuit insulates the Core from the ATM Cell Interface, allowing the Core to operate independently from ATM Cell Interface specifics.

40 Claims, 5 Drawing Sheets

CELL INTERFACE BLOCK PARTITIONING FOR SEGMENTATION AND RE-ASSEMBLY ENGINE

BACKGROUND OF THE INVENTION

1. Field of the Invention

The present invention relates generally to the field of computer systems and, in particular, to a method and apparatus for providing a segmentation and reassembly (SAR) engine which is independent of interface protocol and which can be interfaced to an Asynchronous Transfer Mode (ATM) Cell Interface operating at a different data rate.

2. Description of the Related Art

ATM technology is emerging as the preferred technology for sending information at very high speeds between a transmission point and one or more receiving points. An ATM system facilitates the transmission of data over such a network by defining a set of "data connections" in which each connection represents a virtual circuit having a particular source and destination and an associated data transmission rate.

One particular implementation of an ATM system employs a Cell Interface block configured to implement a Universal Test and Operational Physical Interface (UTOPIA) protocol. The Cell Interface block receives cells from the ATM Layer Core for transfer to the ATM Cell Interface (I.E., UTOPIA). The Cell Interface block also receives cells from the ATM Cell Interface for forwarding to the ATM Layer Core for reassembly into packets for eventual transfer to the host device or local area network (LAN).

Typically, data is transferred over the ATM network using short bursts of 53-byte cells. Each cell consists of 5-header bytes and 48-data bytes. The data stream over the ATM network sent to a particular host device may consist of interleaved cells belonging to several virtual circuits. A receiver at the host device assembles these cells separately depending on which virtual circuit the incoming cell belongs to. Conversely, a transmitter segments the data to be sent across one or more virtual circuits into cells and transmits them according to a predetermined order in a single stream. Thus, cells destined to a particular host device are sent along to a particular virtual circuit.

One technique of segmentation and reassembly includes cellification over the Input/Output (I/O) bus through which data in 48-byte cells are provided from a SAR circuit to a host device or vice versa. This technique however, results in a bottleneck at the I/O bus and is thus inefficient. A second technique involves segmentation and reassembly of the data cells on the SAR circuit between the host and Cell Interface block. Although this technique results in greater efficiency in data transmission over the prior technique, there is bandwidth and data mismatch between the buffer memory, where data to be transmitted and data that is received is stored, and the Cell Interface block. This is because the buffer provides data through a 32-bit data path, while the Cell Interface block supports an 8-bit stream at 20 MHz for 155 Mbps or a 16-bit stream at 40 MHz for a 622 Mbps data stream.

In addition, current standard specifies rates over the ATM network ranging from 25 Mbits to 2.4 Gigabits/second. To conform to the UTOPIA specification, the Cell Interface block has to support an 8-bit stream at 20–25 MHz for 155 Mbps or a 16-bit stream at 40–50 MHz for a 622 Mbps data stream. One problem, in providing such a Cell Interface block, is accounting for the requirements of the two data rates. This is particularly problematic because of possible phase delays of generally unknown duration, occurring between the clock signals operating internally within the ATM Layer Core on the SAR circuit and the clock driving the ATM Cell Interface. In other systems, similar phase or timing delays are accounted for by iteratively tuning the relative phases of the separate systems, perhaps by inserting various delay lines. The need to iteratively tune a system, however, adds to the overall cost of developing the system.

Accordingly, there is a need in the technology to provide a system for interfacing with a Cell Interface block which is not only capable of operating efficiently at different transmission rates, but which also insulates the details of such operation from the ATM Layer Core within the SAR engine.

BRIEF SUMMARY OF THE INVENTION

A method and apparatus for interfacing between a Segmentation and Reassembly (SAR) circuit and an ATM Cell Interface is disclosed. The interface circuit comprises a transmit FIFO and a receive FIFO. The transmit FIFO transfers data from the ATM Layer Core in the SAR circuit to a Cell Interface block, which in turn dispatches the data to the ATM Cell Interface. The receive FIFO transfers data received from the ATM Cell Interface via the Cell Interface block, to the Core. Various interface signals provided between the Core and the transmit FIFO, the transmit FIFO and the Cell Interface block, the Core and the receive FIFO, and the receive FIFO and the Cell Interface block, are used to coordinate data transfer.

The present invention provides, in one embodiment, an interface circuit interposed between a first circuit synchronous to a first clock and a second circuit synchronous to a second clock for transferring data between the first circuit and the second circuit, where the first clock provides a clock rate that is different from the clock rate of the second clock. The interface circuit comprises a first buffer having a plurality of storage locations for transferring data from the first circuit to the second circuit. The interface circuit also comprises a first and second synchronization circuits coupled to the first buffer for synchronizing writes and reads to the first buffer respectively. The first buffer provides a first signal to the first circuit when the first buffer is almost empty and the first circuit transfers data to the first buffer in response to the first signal. The first buffer also provides a second signal to the second circuit when the first buffer is empty and the second circuit ceases to transfer data from the first buffer in response to the second signal. The interface circuit insulates the Core from the ATM Cell Interface, allowing the Core to operate independently from ATM Cell Interface specifics.

DETAILED DESCRIPTION OF THE INVENTION

Figure 1:
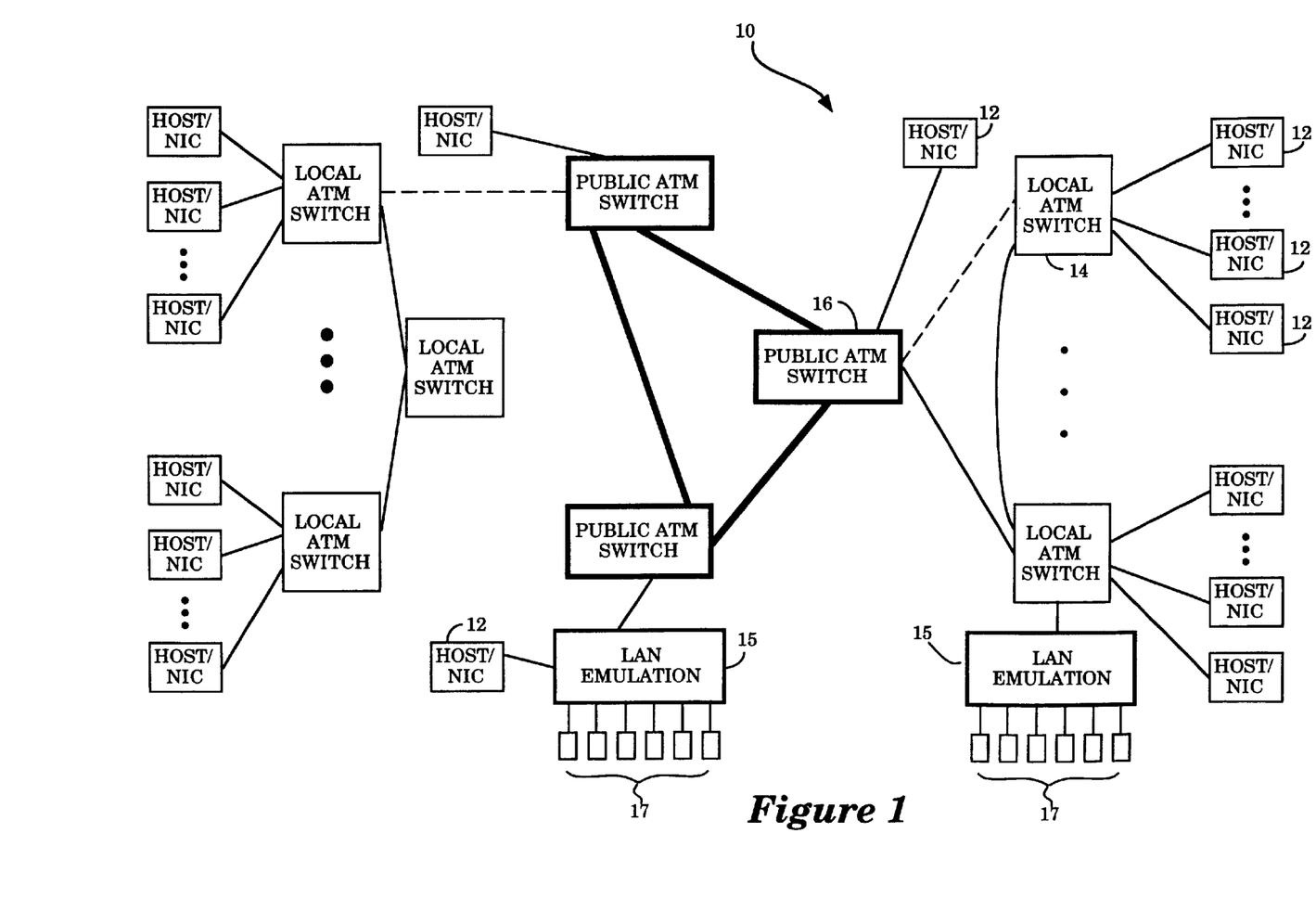
FIG. 1 illustrates an exemplary computer system network incorporating an asynchronous transfer mode network interface circuit which utilizes the method and apparatus of data transfer coordination of the present invention.

FIG. 1 illustrates an exemplary computer system network incorporating the ATM network interface circuit which utilizes the method and apparatus of data transfer coordination of the present invention. The computer system network 10 includes host computer systems (not shown) which incorporate one or more of the ATM network interface controller (NIC) 12. The NICs 12 are coupled through a local ATM switch 14 to a public ATM switch 16 to enable asynchronous transfer of data between host computer systems coupled to the network 10. Alternately, the NICs 12 can be coupled directly to the public ATM switch 16. As shown in FIG. 1, the computer system network 10 may also include computer systems which incorporate the use of a Local Area Network ("LAN") emulation 15 which serves as a gateway for connecting other networks such as Ethernet or token ring networks 17 which utilize the ATM network as a supporting framework.

Figure 2:
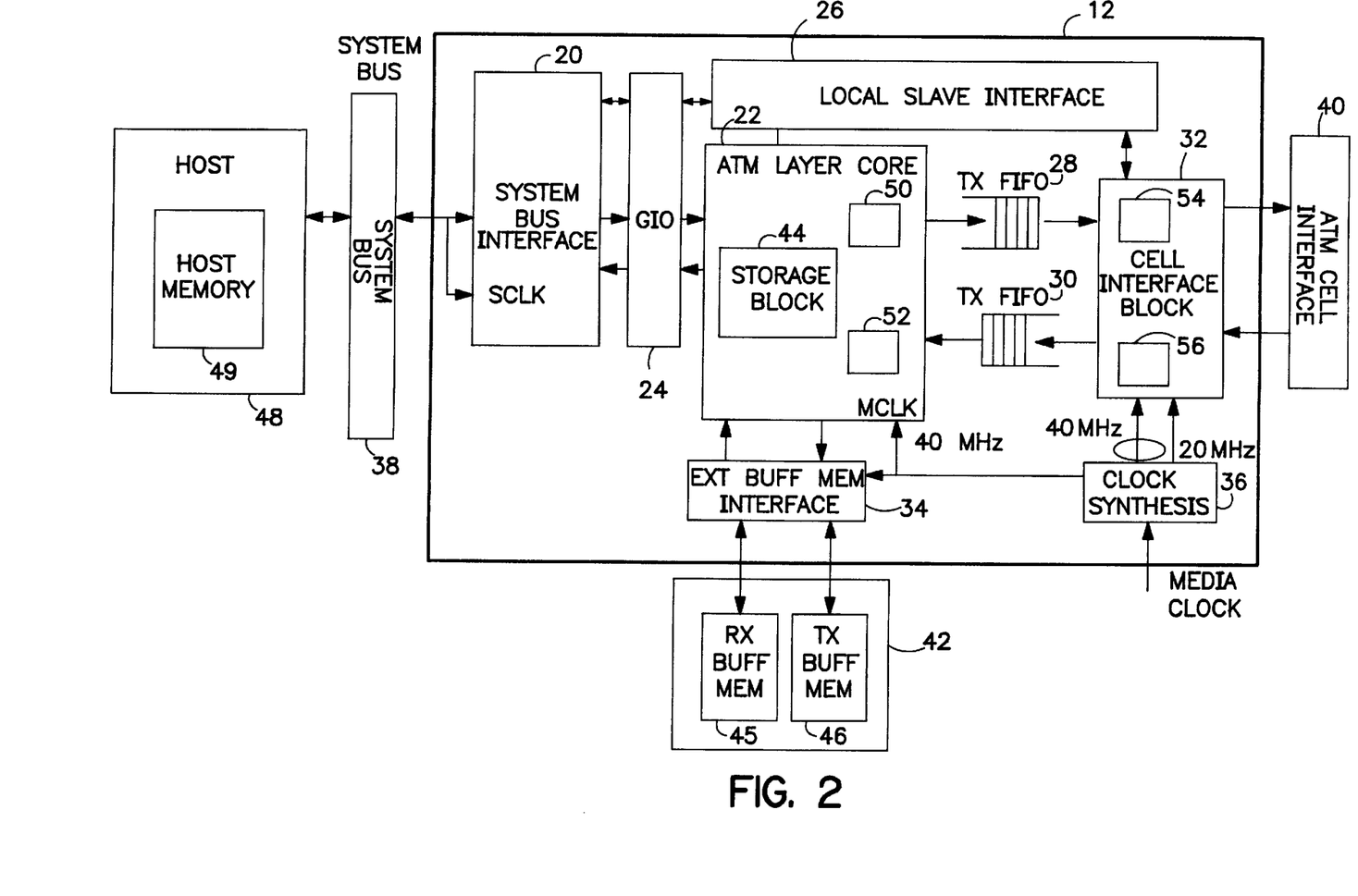
FIG. 2 is an overall system diagram illustrating the architecture of the asynchronous transfer mode network interface circuit which utilizes the method and apparatus of data transfer coordination in accordance with one embodiment of the present invention.

FIG. 2 is a simplified system diagram illustrating the architecture of the ATM NIC 12 which utilizes the method and apparatus of data transfer coordination in accordance with a one embodiment of the present invention. The ATM NIC 12 interfaces a host computer system 48 coupled through system bus 38 to the network ATM Cell Interface 40 operating in accordance with the ATM protocol.

The ATM NIC 12 shown includes a System Bus interface 20, a Generic Input/Output ("GIO") interface 24, an ATM Layer Core 22, a Local Slave interface 26, a transmit (TX) FIFO 28, a receive (RX) FIFO 30, a Cell Interface block 32, an External Buffer Memory Interface 34 and a clock synthesis circuit 36.

Together, the elements 20–36 of NIC 12 cooperate to transfer data between the host computer 48 and the other computers in the network through multiple, dynamically allocated channels in multiple bandwidth groups. Collectively, the elements of the network interface circuit 12 function as a multi-channel intelligent direct memory access (DMA) controller coupled to the System Bus 38 of the host computer system 48. In one embodiment, multiple transmit and receive channels are serviced as virtual connections utilizing a full duplex 155/622 Mbps (Mega bits per second) physical link. Multiple packets of data, subscribed to different channels over the System Bus 38 to the external buffer memory 42, via the External Buffer Memory Interface 34, are segmented by the System and ATM Layer Core 22 into transmit cells for transmission to the ATM Cell Interface 40 through Cell Interface block 32. The Core 22 also comprises reassembly logic to facilitate reassembly of the received cells to packets.

Three memory sub-systems are associated with the operation of the NIC 12. These include the host memory 49 located in the host computer system 48, the external buffer memory 42 external to the NIC 12 and storage block 44 located in the Core 22. The NIC 12 manages two memory areas: the external buffer memory 42 and the storage block 44. The external buffer memory 42 contains packet data for all transmit and receive channels supported by the NIC 12. The storage block 44 contains DMA state information for transmit and receive channels and pointers to data structures in host memory 49 for which DMA transfers are performed. The storage block 44 also contains the data structure specifics to manage multiple transmit and receive buffers for packets in transition between the host 48 and the ATM Cell Interface 40.

The host computer system 48 includes host memory 49 which contains data packets and pointers to the packets being transmitted and received. As noted previously, the NIC 12 also shields the cell delineation details of asynchronous transfer from the applications running on the host computer system. For present purposes, it is assumed that software running on the host computer system 48 manage transmit and receive data using wrap around transmit and receive rings with packet interfaces as is well known in the art.

The TX and RX buffers, for example, TX and RX FIFOS 28 and 30, coupled between the Core 22 and the Cell Interface block 32, are used to stage the transmit and receive cell payloads of the transmit and receive packets respectively. The Cell Interface block 32 transmits and receives cells to the ATM Cell Interface 40 of the network, driven by clock signals provided by Clock Synthesis Circuit 36. Preferably, the ATM Cell Interface 40, and therefore the Cell Interface block 32, conforms to the Universal Test and Operations Physical Interface for ATM ("UTOPIA") standard, as described by the ATM Forum specification. To conform to the UTOPIA specification, the clock synthesis circuit 36 provides either a clock signal of 20–25 MHz or 40–50 MHz to enable the Cell Interface block 32 to support an 8-bit stream at 20–25 MHz for 155 Mbps or a 16-bit stream at 40–50 MHz for a 622 Mbps data stream.

52-byte data cells each having a 4-byte cell header and a 48-byte payload are transferred from the TX FIFO 28 from TX Buffer Memory 46 via the external buffer memory interface 34 under the control of the Core 22, to the Cell Interface block 32 in groups of 4 bytes. When the Cell Interface block 32 receives the data cells through the TX FIFO 28, it inserts into each cell a header checksum as a fifth byte to the cell header prior to providing the 53-byte data cell to the ATM Cell Interface 40 at either 155 or 622 Mbps. Conversely, when the Cell Interface block 32 receives cells from the ATM Cell Interface 40, it examines the header checksum in the fifth byte of each cell to determine if the checksum is correct. If so, the byte representing the checksum is stripped from the cell and the 52-byte data cell is forwarded to the RX FIFO 30 4 bytes at a time at either 155 or 622 Mbps, otherwise the entire cell is dropped. Transferred bytes are stored in the RX Buffer Memory 45 via the external Buffer Memory Interface 34 under the control of Core 22.

In one embodiment, the TX and RX FIFOS 28 and 30 are 33 bits wide, of which 32 bits are used for transmitting data and 1 bit is used as a tag. The tag bit is used to differentiate the 4-byte cell header from the 48-byte cell payload. The tag bit is generated by a TX circuit 50 located within the Core 22. In one embodiment, the tag bit is set to 1 to indicate the start of a cell header and the tag bit is reset to 0 to indicate a cell payload. Thus, the tag bit is 1 for the first 4 bytes of the cell (header) and then the tag bit is 0 for the remaining 48 bytes of the cell (cell payload).

Upon receiving the data cells from the TX FIFO 28, a TX circuit 54 located within the Cell Interface block 32 examines the tag bit. If the tag bit is a 1, the TX circuit 54 decodes the corresponding 32 bits as the header of the cell. If the tag bit is 0, the TX circuit 54 decodes the corresponding 32 bits as data. Conversely, when the Cell Interface block 32 receives data cells from the ATM Cell Interface 40, a RX circuit 56 in the Cell Interface block 32 generates a tag bit to differentiate the 4-byte cell header from the 48-byte cell payload. The Cell Interface block 32 then dispatches the data cells in groups of 4 bytes to RX FIFO 30. Upon receipt of the cell data from the RX FIFO 30, an RX circuit 52 in the Core 22 decodes the cell data in accordance with the value of the tag bit as discussed above.

Two synchronous clock signals, a 20 MHz signal and a 40 MHz signal, are provided to the Cell Interface block 32 from the ATM Cell Interface Clock via the Clock Synthesis circuit 36. A 40 MHz clock is supplied to provide a 16-bit data stream at 40 MHz for 622 Mbps in accordance with the specifications of UTOPIA. A divide by 2 of the 40 MHz clock signal is performed in the Clock Synthesis circuit 36 to provide an 8-bit data stream at 20 MHz for 155 Mbps in accordance with the specifications of UTOPIA. The 40 MHz clock signal is also provided to the external buffer memory interface 34 for providing a 1.2 Gbps transmission rate. In addition, the GIO 24 uses the 40 MHz clock signal for transmitting and receiving data.

The TX Buffer Memory 46 provides 32 bits of data to the TX FIFO 28 and the RX Buffer Memory 45 reads 32 bits of data from the RX FIFO 30 at every cycle of the 40 MHz clock signal. However, the ATM Cell Interface 40 reads 4 bytes of data from TX FIFO 28 every two clock cycles when operating at 622 Mbps, and reads 4 bytes of data from TX FIFO 28 every 8 clock cycles when operating at 155 Mbps. In the same manner, the Cell Interface block provides 4 bytes of data to RX FIFO 30 every two clock cycles when operating at 622 Mbps, and provides 4 bytes of data to RX FIFO 30 every 8 clock cycles when operating at 155 Mbps. Although the cell burst rate of the Core 22 is different from the cell burst rate of the Cell Interface block 32, the data rate between TX FIFO 28 and the Cell Interface block 32 is, on average, the same as the data rate between TX FIFO 28 and the Core 22. Similarly, the data rate between RX FIFO 30 and the Cell Interface block 32 is on average, the same as the date rate between the TX FIFO 28 and the Core 22. This is because the data rate between TX and RX FIFOS 28 and 30 and the Core 22 is dependent the rate that data is read or written by the Cell Interface block 32 respectively. In one embodiment, the depth of the TX FIFO 28 is 18 words or 1½ cells long and the depth of the RX FIFO 30 is 70 words long.

The System Bus Interface 20 and GIO interface 24 insulate the host computer system 48 from the specifics of the transfer to the ATM Cell Interface 40. Furthermore, the Core 22 is insulated from the specifics of the system bus 38 and host specifics. In the present embodiment, the System Bus is an S-Bus, as specified in the Institute of Electronics and Electrical Engineers ("IEEE") standard 1496 specification. The System Bus Interface 20 is configured to communicate in accordance with the specifications of the system bus, in the present illustration, the S-Bus. It is contemplated that the System Bus Interface 20 can be configured to conform to different host computer system busses. The System Bus Interface 20 is also configured to transfer and receive data in accordance with the protocols specified by the GIO interface 24. The GIO interface 24 provides a singular interface through which the Core 22 communicates with the host computer. Thus, the Core 22 does not change for different embodiments of the NIC 12 which interface to different host computer systems and busses.

Figure 3:
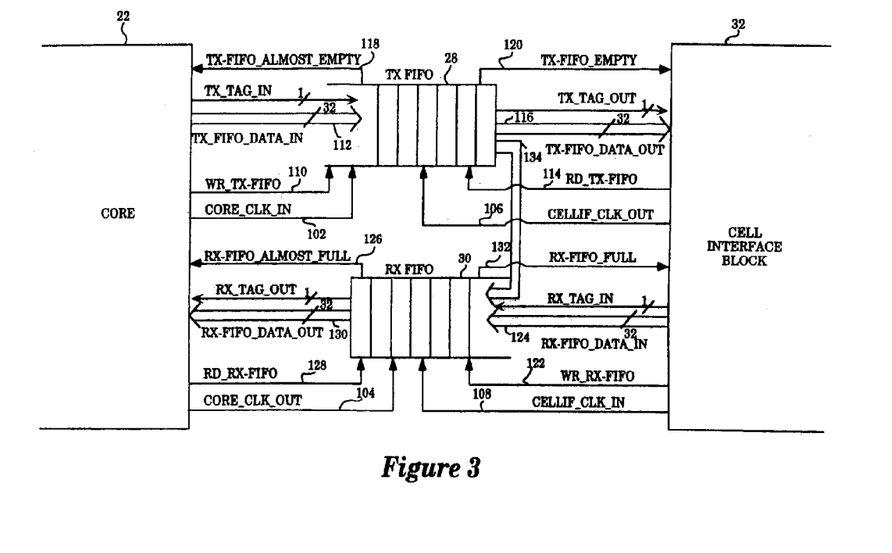
FIG. 3 is a block diagram illustrating the data flow and interface signals of the TX and RX FIFOS with the ATM Layer Core and the Cell Interface block in accordance with one embodiment of the present invention.

FIG. 3 is a block diagram illustrating the data flow and interface signals of TX and RX FIFOS 28 and 30 with the Core 22 and the Cell Interface block 32 in accordance with one embodiment of the present invention. The Core 22 provides clock signals 102 and 104 through CORE__CLK__IN and CORE__CLK__OUT signal lines to the TX and RX FIFOS 28 and 30 respectively. In one embodiment, the clock signals 102 and 104 are between 40 MHz and 50 Mhz. In another embodiment, the clock signals 102 and 104 are fixed at 40 MHz. The clock signal 102 controls the data transfer rate from the Core 22 to the TX FIFO 28, while the clock signal 104 controls the data transfer rate from the RX FIFO 30 to the Core 22. The circuits for providing and receiving clock the signals 102 and 104 through CORE__CLK__IN and CORE__CLK__OUT signal lines respectively, may be implemented by one skilled in the technology.

Similarly, the Cell Interface block 32 provides clock signals 106 and 108 via CELLIF__CLK__OUT and CELLIF__CLK__IN signal lines to TX and RX FIFOS 28 and 30 respectively. The clock signal 106 controls the data transfer rate from the TXFIFO 28 to the Cell Interface block 32, while the clock signal 108 controls the data transfer rate from the Cell Interface block 32 to RX FIFO 30. The data transfer rate, on average, from the Core 22 to the TX FIFO 28 is the same as the data transfer rate from the TX FIFO 28 to the Cell Interface block 32. The data transfer rate, on average, from the Cell Interface block 32 to the RX FIFO 30 is the same as the data transfer rate from the RX FIFO 30 to the Core 22. As is known by one skilled in the art, the cell burst rate of the Core 22 may be slower or faster than the cell burst rate of the Cell Interface block 32, depending on system topology and protocol. In addition, the circuits for providing and receiving the clock signals 106 and 108 via CELLIF__CLK__OUT and CELLIF__CLK__IN signal lines respectively, may be implemented by one skilled in the technology.

Referring to FIG. 3, signal 110 is a write enable signal generated by Core 22 through the WR__TX—FIFO signal line to TX FIFO 28. Signal 110 is asserted by the Core 22 to indicate that the Core 22 is ready to send data to the TX FIFO 28. When signal 110 is asserted, data in the form of a 32 bit signal 112 is provided from Core 22 via signal line TX—FIFO__DATA__IN, to the TX FIFO 28. At the same time, a tag bit is provided via signal line TX__TAG__IN from the Core 22 to the TX FIFO 28. The tag bit and the data thus provided to the TX FIFO 28 remain in the TX FIFO 28 until the Cell Interface block 32 signals that it is ready to read the tag bit and data from the TX FIFO 28. This is initiated through signal 114 via signal line RD__TX—FIFO, which is generated by Cell Interface block 32.

Once initiated, data is provided in the form of a 32-bit signal 116 from TX FIFO 28 to the Cell Interface block 32 via signal line TX—FIFO__DATA__OUT. At the same time, the corresponding tag bit is provided via signal line TX__TAG__OUT from TX FIFO 28 to Cell Interface block 32. In this manner, data is propagated from the Core 22 to the Cell Interface block 32 at a data rate specified by the Core 22, but is read by the Cell Interface block 32 at a rate specified by the Cell Interface block 32. As a result, the Core 22 is isolated from ATM Cell Interface specific protocol and data can be transferred from the Core 22 at one data rate while data may be read by the Cell Interface block 32 at a second data rate. In addition, the respective circuits for providing and receiving: the signal 110 via the WR__TX—FIFO signal line, the signal 112 via the TX—FIFO__DATA__IN signal line, the tag bit via the TX__TAG__IN signal line, signal 114 via the RD__TX—FIFO signal line, the signal 116 via the TX—FIFO__DATA__OUT signal line, and the tag bit via the TX__TAG__OUT signal line, may be implemented by one skilled in the technology when there are less than 6 entries left in the TX FIFO 28.

When the TX FIFO 28 is almost empty, for example, it asserts signal 118 via the TX—FIF__ALMOST__EMPTY signal line to the Core 22 to indicate that it is almost empty and is thus ready for more data bursts. When TX FIFO 28 is indeed empty, it asserts signal 120 via the TX—FIFO__EMPTY signal line to Cell Interface block 32 to indicate that the Cell Interface block 32 that it should prepare to cease reading data. In this manner, data transfer from the Core 22 to the Cell Interface block 32 may be synchronized and dispatched efficiently. The circuits for providing and receiving: the signal 118 via the TX—FIFO_ALMOST_EMPTY signal line, and the signal 120 via the TX—FIFO_EMPTY signal line, may be implemented by one skilled in the technology.

Data is transferred from the Cell Interface block 32 to the Core 22 via RX FIFO 30 in substantially the same manner as described above. Specifically, when data is received by Cell Interface block 32 from ATM Cell Interface 40, it examines the header checksum in the fifth byte of each cell to determine if the checksum is correct. If so, the byte representing the checksum is stripped from the cell and the 52 byte data cell is forwarded to the RX FIFO 30 4 bytes at a time at either 155 or 622 Mbps, otherwise the entire cell is dropped. If the 52 byte data cell is to be forwarded to the RX FIFO 30, Cell Interface block 32 asserts signal 122 via signal line WR_RX—FIFO to indicate that data is to be sent to the RX FIFO 30.

When thus initiated, data in the form of a 32-bit signal 124 is provided from the Cell Interface block to the RX FIFO 30 through the RX—FIFO_DATA_IN signal line. At the same time, a tag bit is provided via signal line TX_TAG_IN from the Cell Interface block 32 to the RX FIFO 30. The tag bit and data thus provided remain in the RX FIFO 30 until the Core 22 indicates that it is ready to read the tag bit and data. When RX FIFO 30 is almost full, indicating that Core 22 should be signaled to prepare for reading the data, RX FIFO 30 generates signal 126 via signal line RX—FIFO_ALMOST_FULL to Core 22.

In one embodiment, the RX FIFO 30 is 70 words entries deep and the signal 126 provided via signal line RX—FIFO_ALMOST_FULL is asserted when there are 10 or fewer available locations left in the RX FIFO 30. Core 22 initiates the reading process by asserting signal 128 via signal line RD_RX—FIFO to RX FIFO 30, and data is provided from RX FIFO 30 to Core 22 in the form of a 32-bit signal 130 via RX—FIFO_DATA_OUT, while the corresponding tag bit is provided from RX FIFO 30 to Core 22 via signal line RX_TAG_OUT. In addition, when RX FIFO 30 is full, it asserts signal 132 via RX—FIFO_FULL signal line to indicate that it is full, so that Cell Interface block 32 will cease sending data to RX FIFO 30.

The respective circuits for providing and receiving: the signal 122 via signal line WR_RX—FIFO, the signal 124 via the RX—FIFO_DATA_IN signal line, the tag bit via the TX_TAG_IN signal line, the signal 126 via the RX—FIFO_ALMOST_FULL signal line, the signal 128 via the RD_RX—FIFO signal line, the signal 130 via the RX—FIFO_DATA_OUT signal line, the tag bit via RX_TAG_OUT signal line, and the signal 132 via RX—FIFO_FULL signal line, may be implemented by one skilled in the technology.

Figure 4A:
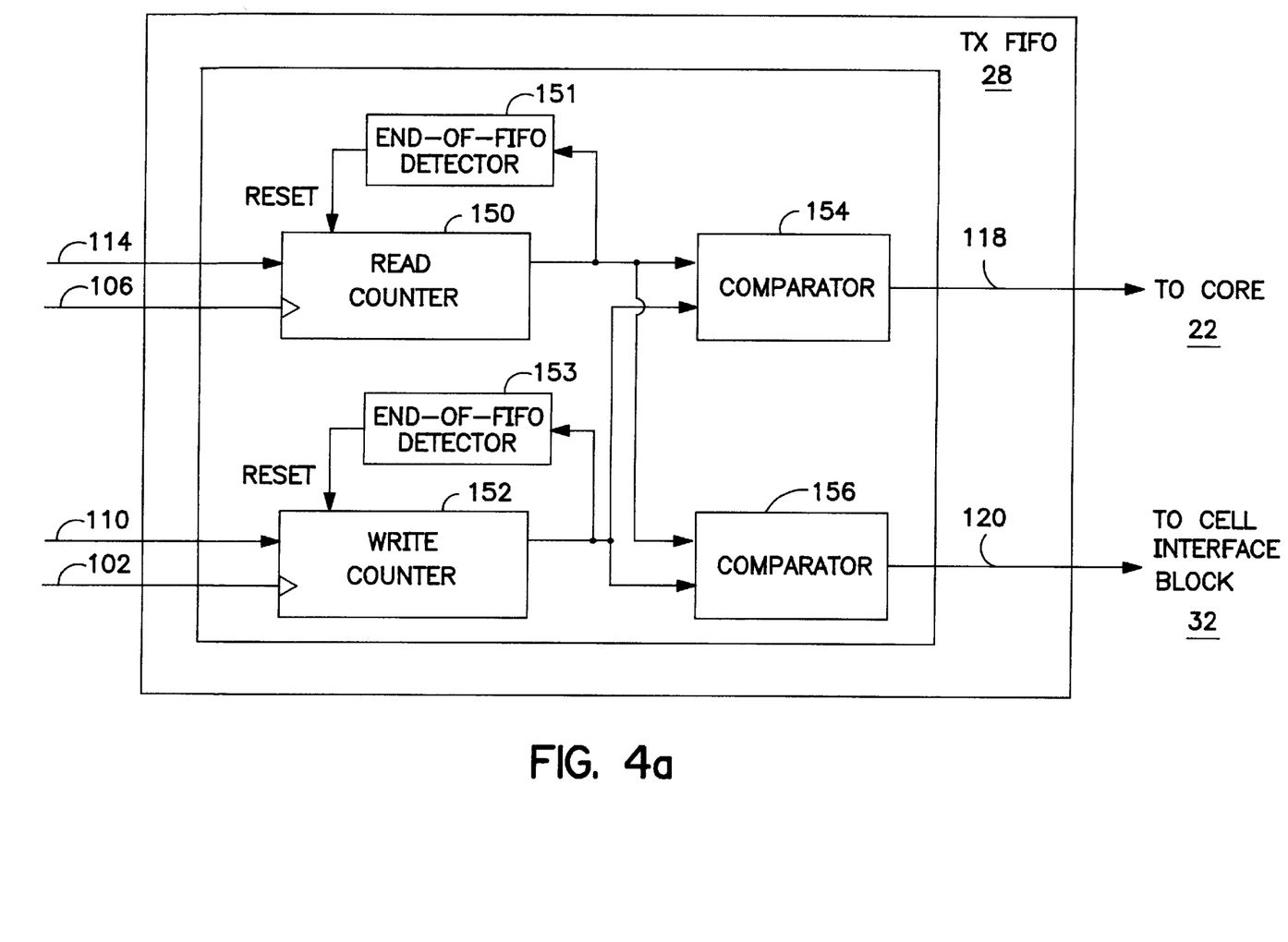
FIGS. 4a and 4b are block diagrams illustrating the counters and comparators utilized by one embodiment of the TX and RX FIFOS 28 and 30 of FIG. 3.
Figure 4B:
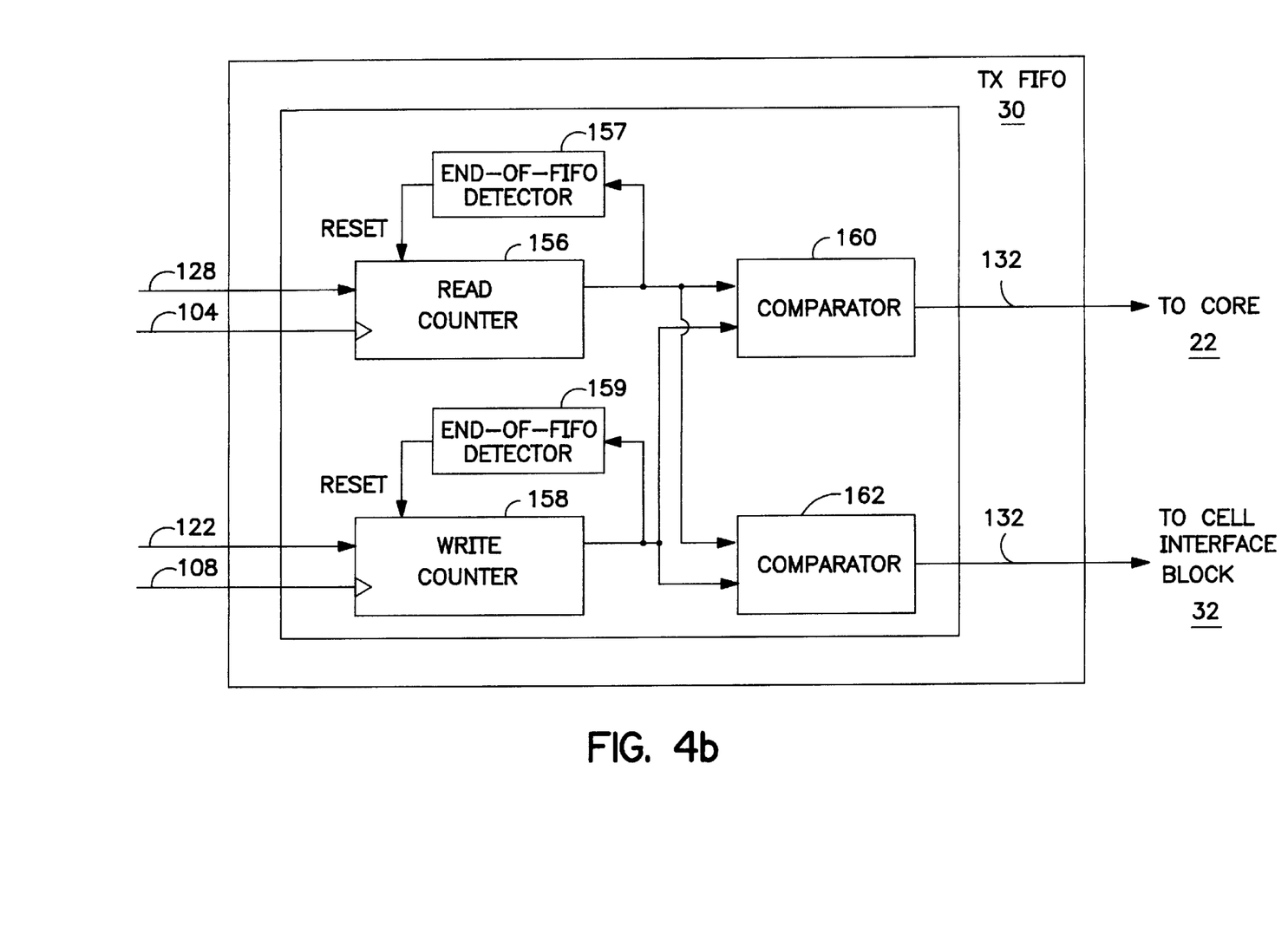

FIGS. 4*a* and 4*b* are block diagrams illustrating the counters and comparators utilized by one embodiment of the TX and RX FIFOS 28 and 30 of FIG. 3. In one embodiment, the TX and RX FIFOS 28 and 30 are RAM-based wrap-around FIFOS as are known by one skilled in the art, and clock signals 102, 106 and 104, 108 are derived off a Core 22 clock of 40 MHz. As shown in FIG. 4*a*, the TX FIFO 28 utilizes a read pointer and a write pointer, which are implemented as read counter 150 and write counter 152 respectively, and a comparator 154 to determine if the TX FIFO 28 is almost empty. In one embodiment, the comparator 154 is an exclusive-OR gate.

An end-of-FIFO detector 151 is coupled to read counter 150 to detect the highest count of the read counter 150. For example, if the TX FIFO 28 is 18 location deep, the read counter 150 will maintain counts of 0 through 17 associated with each entry of the TX FIFO 18. The end-of-FIFO detector 151 monitors the contents of read counter 150 and when the read counter 150 reaches the count of 17, the end-of-FIFO detector 151 resets the read counter 150, so that the read counter 151 will not extend its count beyond 17, but will begin its count from zero. A similar end-of-FIFO detector 153 is coupled to write counter 152.

In particular, when the signal 114 provided via RD_TX—FIFO is asserted, the read counter 150, which is utilized as a read pointer, is incremented. The comparator 154 then compares the value of the read counter 150 with that of the write counter 152, which is utilized as a write pointer. If the value of read counter 150 is less than that of write counter 152 by a predetermined number, sufficient to indicate that TX FIFO 28 is almost empty, the signal 118 provided via the TX—FIFO_ALMOST_EMPTY signal line is asserted. For example, in one embodiment, the signal 118 provided via the TX—FIFO_ALMOST_EMPTY signal line is asserted when there are less than 6 entries left in the TX FIFO 28. Thus, if the TX FIFO 28 is 18 location deep and the read counter 150 has a value of 2 while the write counter 152 has a value of 5, then the comparator 154 will obtain a value of 3, and the signal 118 provided via the TX—FIFO_ALMOST_EMPTY signal line is asserted, indicating to Core 22 that the TX FIFO 28 is ready for another data burst.

Two separate counters, namely, read counter 156 and write counter 158, and a separate comparator 160 may be similarly utilized to determine if RX FIFO 30 is almost full, as shown in FIG. 4*b*. Like the read counter 150 and write counter 152, the read counter 156 and write counter 158 are respectively coupled to an end-of-FIFO detector 157 and 159. The end-of-FIFO detectors 157 and 159 each detects the highest count of the read counter 156 and write counter 158 respectively, and resets the counters 156 and 158 respectively when either of the counters 156 and 158 reaches its highest count. The highest count for either counter 156 or 158 is associated with the depth of the RX FIFO 30.

When the read counter 156 is incremented after the signal 128 provided via RD_RX—FIFO signal line is asserted, the comparator 160 compares the value of read counter 156 to that of write counter 158. If the value of the write counter 158 is greater than that of read counter 156 by a predetermined number, sufficient to indicate that RX FIFO 30 is almost full, the signal 126 provided via the RX—FIFO_ALMOST_FULL signal line is asserted. For example, in one embodiment, the signal 126 provided via the RX—FIFO_ALMOST_FULL signal line is asserted when there are 10 or fewer available locations left in the RX FIFO 30. Thus, if the RX FIFO 30 is 70 location deep and the write counter 158 has a value of 60 while the read counter 156 has a value of 0, the comparator 154 will obtain a value of 10, and the signal 126 provided via the RX—FIFO_ALMOST_FULL signal line is asserted, indicating to Core 22 that the RX FIFO 30 is almost full.

In addition, the read counter 150 and the write counter 152 and the comparator 155 may be utilized to indicate that the TX FIFO 28 is completely empty. When the read counter 150 is incremented after the signal 114 provided via RD_TX—FIFO signal line is asserted, the comparator 155 compares the value of the read counter 150 to that of the write counter 152. If the value of the read counter 150 is equal to that of the write counter 152, the signal 120 is asserted via the TX—FIFO_EMPTY signal line, indicating to the Cell Interface block 32 that the TX FIFO 28 is empty.

The counters 156, 158 and comparator 162 may similarly be utilized by the RX FIFO 30 to determine if the RX FIFO 30 is full. When the counter 158 is incremented after the signal 122 provided via WR_RX—FIFO signal line is asserted, the comparator 162 compares the value of counter 156 to that of counter 158. If the value of counter 156 is equal to that of counter 158, the signal 132 is asserted via the RX—FIFO_FULL signal line, indicating to the Cell Interface block 32 that the RX FIFO 30 is full.

In one embodiment, a loop back path is provided between TX FIFO 28 and RX FIFO 30 via signal line 134 as shown in FIG. 3, to facilitate debugging by isolating a UTOPIA problem or an NIC 12 problem. In particular, the Core 22 sends out a 52 byte cell to TX FIFO 28 which is transmitted to the TX FIFO 28 and RX FIFO 30 through the loop back path. The Core 22 then reads back the 52 byte cell and checks for any errors. The circuits for providing and receiving the loop back path via signal line 134 may be implemented by one skilled in the technology. Thus, when a debugging process is performed utilizing the loop back path, the external buffer memory 42 and circuit within the NIC 12 with the exception of the Cell Interface block 32, are exercised. In this manner, problems can be isolated to the ATM Cell Interface 40 or the Core 22.

Through the application of the present invention, the Core 22 is insulated from the specifics of the ATM Cell Interface 40 and the ATM protocol. In particular, the benefits of using the TX and RX FIFOS 28 and 30 to insulate the Core 22 from the ATM Cell Interface 40 is threefold. First, the Core 22 remains the same for different ATM Cell interfaces and protocols. Second, the data rate between the Core 22 and the TX and RX FIFOS 28 and 30 is independent of the data rate between the TX and RX FIFOS 28 and 30 and the ATM Cell Interface 40. For example, the Core 22 may operate at a much faster or slower burst rate than the ATM Cell Interface 40. Finally, TX and RX FIFOS 28 and 30 allow for burst transfers to the external buffer memory 42 from the Core 22 or from the external buffer memory 42 to the Core 22, resulting in efficient use of the external buffer memory 42.

Modifications and variations of the embodiments described above may be made by those skilled in the technology while remaining within the true scope and spirit of this invention. Thus, although the present invention has been described in terms of certain preferred embodiments, other embodiments that will be apparent to those of ordinary skill in the technology are also within the scope of this invention. Accordingly, the scope of the invention is intended to be defined only by the claims which follow.

What is claimed is:

1. An interface circuit interposed between a first circuit operating at a first clock rate provided by a first clock and a second circuit operating at a second clock rate provided by a second clock for transferring data between the first circuit and the second circuit, the second clock being synchronized to the first clock, the interface circuit comprising:

a first buffer coupled to the first circuit and the second circuit to buffer data for transmission, the first buffer having a plurality of storage locations for receiving data from the first circuit, the first circuit writing data to the first buffer at the first clock rate resulting in a first average data rate, the second circuit reading the written data from the first buffer at the second clock rate resulting in a second average data rate, the second clock rate being independent of the first clock rate, the first and second average data rates being approximately equal, the first buffer providing a first signal to the first circuit when the first buffer is almost empty, the first circuit initiating transfer of data to the first buffer in response to the first signal.

2. The interface circuit of claim 1 wherein the first buffer provides a second signal to the second circuit when the first buffer is empty, the second circuit ceasing to transfer data from the first buffer in response to the second signal.

3. The interface circuit of claim 2, further comprising:

a second buffer coupled to the first circuit and the second circuit to buffer data for reception, the second buffer having a plurality of storage locations for transferring data from the second circuit to the first circuit, the second circuit writing data to the second buffer at the second clock rate resulting in a third average data rate, the first circuit reading the written data from the second buffer at the first clock rate resulting in a fourth average data rate, the third and fourth average data rates being approximately equal, the second buffer providing a third signal to the first circuit when the second buffer is almost full, the first circuit initiating transfer of data from the second buffer in response to the third signal.

4. The interface circuit of claim 3, wherein the second buffer provides a fourth signal to the second circuit when the second buffer is full, the second circuit ceasing to transfer data to the second buffer in response to the fourth signal.

5. The interface circuit of claim 1, wherein the first clock provides signals at 40 MHz to 50 MHz and the second clock provides signals at 20 MHz to 25 MHz.

6. The circuit of claim 1 wherein the first clock provides signals at 40 MHz to 50 MHz and the second clock provides signals at 40 MHz to 50 MHz.

7. The interface circuit of claim 3, wherein the first and second buffers are first-in-first-out (FIFO) buffers.

8. The interface circuit of claim 4, wherein the first and second buffers as first-in-first-out (FIFO) buffers.

9. The interface circuit of claim 3, wherein the first buffer further includes a data path to the second buffer, and wherein data is transferred from the first circuit through the first buffer and the second buffer, back to the first circuit.

10. An interface circuit interposed between a first circuit operating at a first clock rate provided by a first clock and a second circuit operating at a second clock rate provided by a second clock for transferring data between the first circuit and the second circuit, the second clock being synchronized to the first clock, the interface circuit comprising:

a first buffer coupled to the first circuit and the second circuit to buffer data for reception, the first buffer having a plurality of storage locations for receiving data from the second circuit, the second circuit writing data to the first buffer at the second clock rate resulting in a first average data rate, the first circuit reading the written data from the first buffer at the first clock rate resulting in a second average data rate, the second clock rate being independent of the first clock rate, the first and second average data rates being approximately equal, the first buffer providing a first signal to the second circuit when the first buffer is full, the second circuit ceasing to transfer data to the first buffer in response to the first signal.

11. The interface circuit of claim 10, wherein the first buffer provides a second signal to the first circuit when the first buffer is almost full, the first circuit initiating data transfer from the first buffer in response to the second signal.

12. The interface circuit of claim 10, further comprising:

a second buffer coupled to the first circuit and the second circuit to buffer data for transmission, the second buffer having a plurality of storage locations for transferring data from the first circuit to the second circuit, the first circuit writing data to the second buffer at the first clock rate resulting in a third average data rate, the second circuit reading the written data from the second buffer at the second clock rate resulting in a fourth average data rate, the third and fourth average data rates being approximately equal, the second buffer providing a third signal to the first circuit when the second buffer is almost empty, the first circuit initiating transfer of data to the second buffer in response to the third signal.

13. The interface circuit of claim 12, wherein the second buffer provides a fourth signal to the second circuit when the second buffer is empty, the second circuit ceasing to transfer data from the second buffer in response to the fourth signal.

14. The interface circuit of claim 10, wherein the first clock provides signals at 40 MHz to 50 MHz and the second clock provides signals at 20 MHz to 25 MHz.

15. The interface circuit of claim 10 wherein the first clock provides signals at 40 MHz to 50 MHz and the second clock provides signals at 40 MHz to 50 MHz.

16. The interface circuit of claim 12, wherein the first and second buffers are first-in-first-out (FIFO) buffers.

17. The interface circuit of claim 13, wherein the first and second buffers are first-in-first-out (FIFO) buffers.

18. The interface circuit of claim 12, wherein the second buffer further includes a data path to the first buffer, and wherein data is transferred from the first circuit through the second buffer and the first buffer, back to the first circuit.

19. A computer system comprising:
a host processor;
a memory coupled to the host processor;
a system bus coupled to the host processor;
a network circuit operating at a first clock rate provided by a first clock and coupled to the system bus for providing network communication, the network circuit having a Core circuit;
a Cell Interface circuit operating at a second clock rate provided by a second clock and coupled to the network circuit, the second clock being synchronized to the first clock;
an interface circuit interposed between the Core circuit and the Cell Interface circuit for transferring data between the Core circuit and the Cell Interface circuit, the interface circuit comprising:
a first buffer coupled to the Core circuit and the Cell Interface circuit to buffer data for transmission, the first buffer having a plurality of storage locations for receiving data from the network circuit, the Core circuit writing data to the first buffer at the first clock rate resulting in a first average data rate, the ATM Cell Interface circuit reading the written data from the first buffer at the second clock rate resulting in a second average data rate, the second clock rate being independent of the first clock rate, the first and second average data rates being approximately equal, the first buffer providing a first signal to the Core circuit when the first buffer is almost empty, the Core circuit initiating transfer of data to the first buffer in response to the first signal.

20. The computer system of claim 19, wherein the first buffer provides a second signal to the second circuit when the first buffer is empty, the Cell Interface circuit ceasing to transfer data from the first buffer in response to the second signal:
a second buffer coupled to the first circuit and the second circuit to buffer data for reception, the second buffer having a plurality of storage locations for transferring data from the second circuit to the first circuit, the second circuit writing data to the second buffer at the second clock rate resulting in a third average data rate, the first circuit reading the written data from the second buffer at the first clock rate resulting in a fourth average data rate, the third and fourth average data rates being approximately equal, the second buffer providing a third signal to the first circuit when the second buffer is almost full, the first circuit initiating transfer of data from the second buffer in response to the third signal.

21. The computer system of claim 19, wherein the interface circuit further comprises:
a second buffer coupled to the first circuit and the second circuit to buffer data for reception, the second buffer having a plurality of storage locations for transferring data from the Cell Interface circuit to the Core circuit, the Cell Interface circuit writing data to the second buffer at the second clock rate resulting in a third average data rate, the Core circuit reading the written data from the second buffer at the first clock rate resulting in a fourth average data rate, the third and fourth average data rates being approximately equal, the second buffer providing a third signal to the Core circuit when the second buffer is almost full, the Core circuit initiating transfer of data from the second buffer in response to the third signal.

22. The computer system of claim 21, wherein the second buffer provides a fourth signal to the Cell Interface circuit when the second buffer is full, the Cell Interface circuit ceasing to transfer data to the second buffer in response to the fourth signal.

23. The computer system of claim 21, wherein the first and second buffers are first-in-first-out (FIFO) buffers.

24. The computer system of claim 22, wherein the first and second buffers are first-in-first-out (FIFO) buffers.

25. A computer system comprising:
a host processor;
a memory coupled to the host processor;
a system bus coupled to the host processor;
a network circuit operating at a first clock rate provided by a first clock and coupled to the system bus for providing network communication, the network circuit having a Core circuit;
a Cell Interface circuit operating at a second clock rate provided by a second clock and coupled to the network circuit, the second clock being synchronized to the first clock;
an interface circuit interposed between the Core circuit and the Cell Interface circuit for transferring data between the Core circuit and the Cell Interface circuit, the interface circuit comprising:
a first buffer coupled to the first circuit and the second circuit to buffer data for reception, the first buffer having a plurality of storage locations for receiving data from the Cell Interface circuit, the Cell Interface circuit writing data to the first buffer at the second clock rate resulting in a first average data rate, the Core circuit reading the written data from the first buffer at the first clock rate resulting in a second average data rate, the second clock rate being independent of the first clock rate, the first and second average data rates being approximately equal, the first buffer providing a first signal to the Cell Interface circuit when the first buffer is full, the Cell Interface circuit ceasing to transfer data to the first buffer in response to the first signal.

26. The computer system of claim 25, wherein the first buffer provides a second signal to the Core circuit when the first buffer is almost full, the Core circuit initiating data transfer from the first buffer in response to the first signal.

27. The computer system circuit of claim 25, further comprising:

a second buffer coupled to the Core circuit and the Cell Interface circuit to buffer data for transmission, the second buffer having a plurality of storage locations for transferring data from the Core circuit to the Cell Interface circuit, the Core circuit writing data to the second buffer at the first clock rate resulting in a third average data rate, the Cell Interface circuit reading the written data from the second buffer at the second clock rate resulting in a fourth average data rate, the third and fourth average data rates being approximately equal, the second buffer providing a third signal to the Core circuit when the second buffer is almost empty, the Core circuit initiating transfer of data to the second buffer in response to the third signal.

28. The computer system of claim 27, wherein the second buffer provides a fourth signal to the Cell Interface circuit when the second buffer is empty, the Cell Interface circuit ceasing to transfer from the second buffer in response to the fourth signal.

29. The computer system of claim 27, wherein the first and second buffers are first-in-first-out (FIFO) buffers.

30. The computer system of claim 28, wherein the first and second buffers are first-in-first-out (FIFO) buffers.

31. A method for coordinating data transfer between a first circuit operating at a first clock rate provided by a first clock and a second circuit operating at a second clock rate provided by a second clock for transferring data between the first circuit and the second circuit, the second clock being synchronized to the first clock, the method comprising the steps of:

writing data from the first circuit to a first buffer at the first clock rate, the writing resulting in a first average data rate;

reading the written data from the first buffer by the second circuit at the second clock rate, the reading resulting in a second average data rate, the second clock rate being independent of the first clock rate, the second average data rate and the first average data rate being approximately equal;

providing a first signal from the first buffer to the first circuit when the first buffer is almost empty; and initiating transfer of data from the first circuit to the first buffer in response to the first signal.

32. The method of claim 31, further comprising the step of:

providing a second signal from the first buffer to the second circuit when the first buffer is empty, the second circuit ceasing to transfer data from the first buffer in response to the second signal.

33. The method of claim 32, further comprising the steps of:

providing a third signal from a second buffer to the first circuit when the second buffer is almost full; and initiating transfer of data from the second buffer to the first circuit in response to the third signal.

34. The method of claim 33, further comprising the step of:

providing a fourth signal from the second buffer to the second circuit when the second buffer is full, the second circuit ceasing to transfer data to the second buffer in response to the fourth signal.

35. The method of claim 31, further comprising the step of providing a data path from the first buffer to the second buffer, wherein data is transferred from the first circuit through the first buffer and the second buffer, back to the first circuit.

36. A method for coordinating data transfer between a first circuit operating at a first clock rate provided by a first clock and a second circuit operating at a second clock rate provided by a second clock for transferring data between the first circuit and the second circuit, the second clock being synchronized to the first clock, the method comprising the steps of:

writing data from the second circuit to a first buffer at the second clock rate, the writing resulting in a first average data rate;

reading the written data from the first buffer by the first circuit at the first clock rate, the first clock rate being independent of the second clock rate, the reading resulting in a second average data rate, the second average data rate and the first average data rate being approximately equal;

providing a first signal to the second circuit when the first buffer is full; and ceasing to transfer data from the second circuit to the first buffer in response to the first signal.

37. The method of claim 36, further comprising the step of:

providing a second signal from the first buffer to the first circuit when the first buffer is almost full, the first circuit initiating transfer of data from the first buffer in response to the second signal.

38. The method of claim 36, further comprising the step of:

providing a third signal from a second buffer to the first circuit when the second buffer is almost empty, the first circuit initiating transfer of data from the second buffer in response to the third signal.

39. The method of claim 38, further comprising the step of:

providing fourth signal from the second buffer to the second circuit when the second buffer is empty, the second circuit ceasing to transfer data from the second buffer in response to the fourth signal.

40. The method of claim 36, further comprising the step of providing a data path from the second buffer to the first buffer, wherein data is transferred from the first circuit through the second buffer and the first buffer, back to the first circuit.

* * * * *

UNITED STATES PATENT AND TRADEMARK OFFICE
CERTIFICATE OF CORRECTION

PATENT NO.    : 5,982,772
DATED         : November 9, 1999
INVENTOR(S)   : Oskouy It is certified that error appears in the above-identified patent and that said Letters Patent is hereby corrected as shown below:

The title page should be deleted to appear as per attached title page.

<u>Title page,</u>
Please insert:

-- [*]  Notice:   This patent issued on a continued prosecution application filed under 37 CFR 1.53(d), and is subject to the twenty year patent term provisions of 35 U.S.C. 1.54(a)(2).

Subject to any disclaimer, the term of this patent is extended or adjusted under 35 U.S.C 154(b) by 0 days. --

# United States Patent [19]

Oskouy

[11] Patent Number: 5,982,772
[45] Date of Patent: Nov. 9, 1999

[54] CELL INTERFACE BLOCK PARTITIONING FOR SEGMENTATION AND RE-ASSEMBLY ENGINE

[75] Inventor: Rasoul M. Oskouy, Fremont, Calif.

[73] Assignee: Sun Microsystems, Inc., Mountain View, Calif.

[21] Appl. No.: 08/554,186

[22] Filed: Nov. 6, 1995

[51] Int. Cl.[6] .............................. H04L 12/56; H04J 3/24
[52] U.S. Cl. .......................... 370/395; 370/474; 370/473
[58] Field of Search ..................................... 370/395, 412, 370/545, 249, 391, 401, 410, 465, 467, 470, 474, 389, 505, 516, 473; 371/205; 375/221, 225

[56] References Cited

U.S. PATENT DOCUMENTS

| | | | |
|---|---|---|---|
| 5,083,269 | 1/1992 | Syobatake et al. | 395/427 |
| 5,136,584 | 8/1992 | Hedlund | 370/474 |
| 5,157,655 | 10/1992 | Hamlin, Jr. et al. | 370/545 |
| 5,261,076 | 11/1993 | Shamshirian | 395/500 |
| 5,303,302 | 4/1994 | Burrows | 380/49 |
| 5,321,806 | 6/1994 | Meinerth et al. | |
| 5,420,858 | 5/1995 | Marshall et al. | 370/395 |
| 5,434,872 | 7/1995 | Petersen et al. | |
| 5,541,926 | 7/1996 | Saito et al. | 370/474 |
| 5,602,853 | 2/1997 | Ben-Michael et al. | 370/395 |
| 5,638,367 | 6/1997 | Gaytan et al. | 370/471 |

FOREIGN PATENT DOCUMENTS

WO 92/22034  12/1992  WIPO.

OTHER PUBLICATIONS

Wescon Technical Papers, vol. 36, Nov. 17, 1992, pp. 174–178.

*Primary Examiner*—Chau Nguyen
*Assistant Examiner*—Soon-Dong Hyun
*Attorney, Agent, or Firm*—Blakely Sokoloff Taylor & Zafman

[57] ABSTRACT

A method and apparatus for interfacing between a Segmentation and Reassembly (SAR) circuit and an ATM Cell Interface is disclosed. The interface circuit comprises a transmit FIFO and a receive FIFO. The transmit FIFO transfers data from the System and ATM Layer Core in the SAR circuit to a Cell Interface block, which in turn dispatches the data to the ATM Cell Interface. The receive FIFO transfers data received from the ATM Cell Interface via the Cell Interface block, to the Core. Various interface signals provided between the Core and the transmit FIFO, the transmit FIFO and the Cell Interface block, the Core and the receive FIFO, and the receive FIFO and the Cell Interface block, are used to coordinate data transfer. The interface circuit insulates the Core from the ATM Cell Interface, allowing the Core to operate independently from ATM Cell Interface specifics.

40 Claims, 5 Drawing Sheets

UNITED STATES PATENT AND TRADEMARK OFFICE
CERTIFICATE OF CORRECTION

PATENT NO.   : 5,982,772                                          Page 3 of 3
DATED        : November 9, 1999
INVENTOR(S)  : Oskouy It is certified that error appears in the above-identified patent and that said Letters Patent is hereby corrected as shown below:

Drawings,
Sheet 3 of 5, please insert the following Figure 3 and delete duplicate Figure 4a:

Figure 3

Signed and Sealed this

Fifteenth Day of April, 2003

JAMES E. ROGAN
*Director of the United States Patent and Trademark Office*